United States Patent Office 2,798,078
Patented July 2, 1957

2,798,078
ESTERS OF 5-KETO-1,3-DIOXACYCLOHEXANES AND THEIR PREPARATION

Edward G. Howard, Jr., Hockessin, Del., assignor to E. I. du Pont de Nemours and Company, Wilmington, Del., a corporation of Delaware No Drawing. Application April 21, 1955,
Serial No. 503,031

11 Claims. (Cl. 260—340.7)

This invention relates to new compounds and to their preparation.

This invention has as an object the preparation of new compounds. A further object comprises the new compounds thus prepared. Another object is the preparation of compounds whose structure allows the preparation of chelate compounds therefrom. Still another object is the preparation of compounds suitable as metal deactivators for gasoline and as fuel additives. Still another object is the preparation of compounds suitable for the preparation of pigments. Other objects will appear hereinafter.

These objects are accomplished by the present invention of 5-keto-1,3-dioxacyclohexanes conforming to the structure:

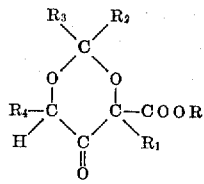

in which the R's are hydrogen or monovalent hydrocarbon groups free of olefinic unsaturation, especially alkyl groups of 1 to 12 carbon atoms. A further object is the provision of 5-keto-4-alkoxycarbonyl-1,3-dioxacyclohexanes. A still further phase of the invention is the process whereby these compounds are prepared, by adding to a solution of an alkali metal alkoxide of a volatile alcohol in a volatile organic solvent an ester of a 3,5-dioxa-1,7-heptanedioic acid which has at least one free hydrogen on each of the carbons which is alpha to the carboxycarbonyl groups, and separating the product which forms.

In one method for preparing the esters of the 3,5-dioxa-1,7-heptanedioic acids an acetylene of formula R—C≡CH, in which R is hydrogen or monovalent hydrocarbon group free of olefinic unsaturation, is condensed with an ester of an alpha-hydroxymonocarboxylic acid having hydrogen on the alpha carbon, i. e., that bearing the hydroxyl, e. g., hydroxyacetic, lactic, and mandelic acids. This addition can be effected by the method of Coffman U. S. Patent 2,387,495, i. e., by reacting the acetylene and the ester at atmospheric or elevated pressures and at a temperature of 20° C.–150° C. in the presence of a mercury catalyst. Other methods which are usefully employable include alkoxy group interchange involving an alcohol exchange between an hydroxy acid ester and an acetal and interaction between an aldehyde and an hydroxy acid ester, as disclosed in Zook and Wagner's "Synthetic Organic Chemistry" (Wiley, 1953), pages 265 and 266. Thus, by using such aldehydes as formaldehyde, benzaldehyde, butraldehyde, cyclohexanecarboxaldehyde, p-chlorobenzaldehyde, p-tolualdehyde, etc., with an hydroxy acetic ester there are obtained 3,5-dioxa-1,7-heptanedioate, 3,5-dioxa-4-phenyl-1,7-heptanedioate, 3,5-dioxa-4-propyl-1,7-heptanedioate, 3,5-dioxa-4-cyclohexyl-1,7-heptanedioate, 3,5 - dioxa-4(p-chlorophenyl) - 1,7-heptanedioate, 3,5-dioxa-4(p-tolyl)-1,7-heptanedioate esters, and with a ketone such as dimethyl ketone, methyl ethyl ketone, methyl cyclohexyl ketone, butyl phenyl ketone and an hydroxy acetic ester there are obtained 3,5-dioxa-4,4 - dimethyl - 1,7 - heptanedioate, 3,5 - dioxa - 4-ethyl-4-methyl - 1,7 - heptanedioate, 3,5 - dioxa - 4 - cyclohexyl-4-methyl-1,7-heptanedioate, 3,5-dioxa-4-butyl-4-phenyl-1,7-heptanedioate esters, etc.

The compounds of this invention are conveniently prepared by the following method. An alkali metal is dissolved in a volatile aliphatic monohydric alcohol, e. g., methanol. The solution is cooled to between 0° C. and 10° C., and diluted with an inert organic solvent, e. g., diethyl ether. Thereafter there is added an ester of a 3,5-dioxa-1,7-heptanedioic acid, the mixture maintained between 0° C. and 10° C. for at least one hour, and then permitted to warm to room temperature. The mixture is maintained at room temperature for from 5 to 20 hours. The product which forms is conveniently separated by decantation, dissolved in an aliphatic monohydric alcohol, e. g., methanol, the solution acidified, and the product filtered and dried. Purification is conveniently effected by sublimation.

The following examples in which parts are by weight are illustrative of the invention.

EXAMPLE I

Sodium methoxide was prepared by adding 2.3 g. (0.1 g. atom) of sodium to 35 ml. of absolute CH₃OH. When conversion to NaOCH₃ was complete, 100 ml. of absolute Et₂O was added. The stirred mixture was cooled to —5° C. and 20.6 g. (0.1 mole) of

was added. In about 2 hours a white solid began to precipitate.

The temperature was maintained at 0° C. to 5° C. for 8 hours and at room temperature for the next 12 hours. After removing the ether from the reaction mixture by vacuum evaporation, the resulting solid, the sodium salt of 2-methyl-4-methoxycarbonyl-5-keto-1,3-dioxacyclohexane, was dissolved in 200 ml. of absolute CH₃OH. The sodium was removed by adding a methanolic solution of sulfamic acid until the solution gave a pH of about 7.5. The solid was removed by filtration and the methanol removed by vacuum evaporation. The resulting paste-like mixture (13.5 g.) was filtered. The solid was recrystallized from petroleum ether, M. P. 65.5–68.5° C. A sample of the recrystallized material was vacuum sublimed to give pure 2-methyl-4-methoxycarbonyl-5-keto-1,3-dioxacyclohexane.

*Analysis.*—Calculated for C₇H₁₀A₅: C, 48.28%; H, 5.79%; M.W. 174. Found: C, 48.76%, 47.63%; H, 5.84%, 5.95%; M. W. 175, 172.

2-methyl-4-methoxycarbonyl - 5-keto - 1,3 - dioxacyclohexane is a white solid melting at 76° C. to 77° C. after recrystallization from methanol. When the 2-methyl-4-methoxycarbonyl-5-keto-1,3-dioxacyclohexane was permitted to stand at room temperature, it gradually liquefied, due to a tautomeric change of the enol to the keto configuration.

2-methyl-4-methoxycarbonyl - 5-keto - 1,3 - dioxacyclohexane is slightly soluble in water. When a solution of an iron salt, e. g., ferric chloride, was added to such aqueous solutions a deep purple color developed due to chelation with the ferric ion.

Example I is repeated, using dimethyl 2,4,6-trimethyl-3,5-dioxa-1,7-heptanedioate and dimethyl 2,6-diphenyl-4-methyl-3,5-dioxa-1,7-heptanedioate, respectively, in place of dimethyl 4-methyl-3,5-dioxa-1,7-heptanedioate to produce 4-methoxycarbonyl-2,4,6-trimethyl-5-keto-1,3-dioxacyclohexane and 4 - methoxycarbonyl - 4,6 - diphenyl-2-methyl-1,3-dioxa-5-ketocyclohexane, respectively.

EXAMPLE II

To a rapidly stirred mixture of 4.2 g. (0.4 g. atom) of sodium in 250 ml. of xylene at 130° C.–140° C. in a 4-necked flask fitted with a condenser, dropping funnel, and nitrogen inlet tube, in addition to the mechanical stirrer, there was added a solution of 41.2 g. (0.2 mole) of dimethyl 4-methyl-3,5-dioxa-1,7-heptanedioate in 50 ml. of xylene. After 2 hours longer at 130° C.–140° C., the slurry of light brown solid was cooled and 300 ml. of absolute methanol was added. The mixture was neutralized with dry hydrogen chloride, the resulting sodium chloride precipitate was removed by filtration and the filtrate distilled. There resulted 10 g. of 2-methyl-4-methoxycarbonyl-5-keto-1,3-dioxacyclohexane, B. P. at 0.55 mm., 65° C.–70° C. and melting at 75° C. when recrystallized from methanol. No depression of melting point was noted when mixed with the product from the previous example.

The dimethyl 4 - methyl - 3,5 - dioxa - 1,7 - heptanedioates used in the above examples were prepared as described in Example II of U. S. 2,387,495 by reacting acetylene with methyl hydroxyacetate. The dimethyl 2,4,6 - trimethyl - 3,5 - dioxa - 1,7 - heptanedioate and the dimethyl 2,6 - diphenyl - 4 - methyl - 3,5 - dioxa - 1,7-heptanedioate are similarly prepared from acetylene and the methyl esters of lactic and mandelic acids, respectively. The method of this patent is applicable to the preparation of other esters of 3,5-dioxa-1,7-heptanedioic acid.

The intramolecular condensation is effected in the presence of a strong base, e. g., one suitable for Claisen condensations. Examples are sodium and sodium alkoxides. In place of sodium or sodium alkoxide there may be used other alkali metal or alkali metal alkoxides, e. g., potassium and lithium and their alkoxides. Sodium and sodium alkoxides are preferred because of the availability of sodium and its lower cost, as compared to the other alkali metals.

The product from the intramolecular condensation is the alkali metal enolate of the 4-alkoxycarbonyl-5-keto-1,3-dioxacyclohexane. The free 4-alkoxycarbonyl-5-keto-1,3-dioxacyclohexane is obtained by acidification of an organic solvent solution or suspension of the salt, conveniently with dry hydrogen chloride, separation of the alkali metal chloride by decantation or filtration, followed by evaporation of the solvent or drowning in a non-solvent for the resulting product.

Instead of the methyl ester of 3,5-dioxa-1,7-heptanedioic acid of Examples I or II, there may be employed the esters listed in the left column of the table below to give the products noted in the right column.

Table I

| | |
|---|---|
| Dimethyl 3, 5-dioxa-4-phenyl-4-methyl-1,7-heptanedioate. | 2-Methyl-2-phenyl-4-methoxycarbonyl-5-keto-1,3-dioxacyclohexane. |
| Dimethyl 3,5 - dioxa - 4 - butyl -4 - methyl-1,7-heptanedioate. | 2 - Methyl-2-butyl-4-methoxycarbonyl-5-keto-1,3-dioxacyclohexane. |
| Dimethyl 3,5 - dioxa - 4 - ethyl - 4 - methyl-1,7-heptanedioate. | 2 - Methyl - 2 - ethyl - 4 - ethoxycarbonyl-5-keto-1,3-dioxacyclohexane. |
| Dimethyl 3,5- dioxa- 4-cyclo-hexyl-4-methyl-1,7-heptanedioate. | 2-Methyl- 2 -cyclohexyl- 4 -methoxycarbonyl-5-keto-1,3-dioxacyclohexane. |
| Dimethyl 3,5 -dioxa- 4,4-dimethyl-1,7-heptanedioate. | 2,2-Dimethyl-4-methoxy-carbonyl-5-keto-1,3-dioxacyclohexane. |
| Dimethyl 3,5-dioxa- 4 -methyl- 4 - (p-chlorophenyl)- 1,7-heptanedioate. | 2 -Methyl- 4 - (p-chloro-phenyl)-4-methoxycarbonyl - 5 - keto - 1,3-dioxacyclohexane. |
| Diethyl 3,5-dioxa- 2,4,6 - trimethyl-1,7-heptanedioate. | 2,4,6-Trimethyl-4-ethoxycarbonyl-5-keto-1,3-dioxacyclohexane. |
| Dimethyl 3,5-dioxa-4,4-dimethyl-1,7-heptanedioate. | 2,2-Dimethyl 1,4-methoxycarbonyl 5-keto-1,3-dioxacyclohexane. |
| Dimethyl 3,5-dioxa-1,7-heptanedioate. | 4-methoxycarbonyl-5-keto-1,3-dioxacyclohexane. |

In place of the xylene of Example II, there may be used other inert reaction media, such as, benzene, toluene, isooctane, diethyl ether, and the like.

The amount of reaction medium is not critical and may be varied over wide limits. As a rule there is no advantage to be gained from using more than 10 times the weight of the ester of the 3,5-dioxa-1,7-heptanedioic acid being condensed.

The condensation step is effected at temperatures from 0° C. to 150° C. As a rule, however, good results are obtained between 0° C. and 10° C. and such temperatures are generally employed.

In place of the sodium methoxide of the examples there may be used alkoxides of such other aliphatic monohydric alcohols as ethanol, t-butyl alcohol, and the like. Methanol, however, is preferred because of its availability and low cost.

The amount of alkali metal or metal alkoxide employed in the condensation is at least molar equivalent of the ester of the 3,5-dioxa-1,7-heptanedioic acid being condensed.

The present invention is generic to 5-keto-1,3-dioxacyclohexanes of the formula

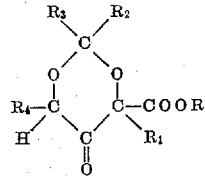

wherein R, $R_1$, $R_2$, $R_3$, and $R_4$ are hydrogen or monovalent hydrocarbon radicals preferably hydrogen or alkyl groups of one to twelve carbon atoms.

These 5-keto-4-alkoxycarbonyl-1,3-dioxacyclohexanes of this invention are useful as gasoline additives to promote combustion. Chelates which are deeply colored, for example, the chelates with ferric iron are useful as pigments.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A lower alkyl ester of a 5 - keto - 4 - carboxyl - 1,3-dioxacyclohexane.

2. A compound of the formula

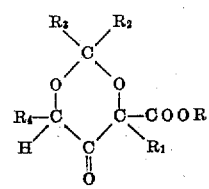

wherein each R is selected from the class consisting of hydrogen, alkyl of 1–12 carbon atoms, cycloalkyl, monoaryl, and monochloroaryl radicals.

3. A 2 - lower alkyl - 4 - lower alkoxycarbonyl - 5 - keto - 1,3 - dioxacyclohexane.

4. A 2 - alkyl - 4 - alkoxycarbonyl - 5 - keto - 1,3 - dioxacyclohexane wherein the alkyl and alkoxy groups are of from one to twelve carbons.

5. 2 - methyl - 4 - lower alkoxycarbonyl - 5 - keto - 1,3 - dioxacyclohexane.

6. 2 - methyl - 4 - methoxycarbonyl - 5 - keto - 1,3-dioxacyclohexane.

7. A process for the preparation of esters of 5 - keto - 4-carboxy - 1,3 - dioxacyclohexanes which comprises intramolecularly condensing a 3,5 - dioxa - 1,7 - heptanedioate of an alkanol of from 1–12 carbon atoms in solution in a volatile organic solvent in the presence of a Claisen condensation catalyst, said 3,5 - dioxa - 1,7 - heptanedioate having at least one hydrogen on each of the carbons alpha to the carboxyl groups.

8. Process of claim 7 wherein the catalyst is selected from the class consisting of alkali metals and alkali metal alkoxides.

9. Process of claim 8 wherein the ester is of an alkanol of one to twelve carbons.

10. Process of claim 7 wherein the ester is of a 3,5-dioxa - 1,7 - heptanedioic acid having as its only substituent a lower alkyl group on the 4 carbon.

11. Process of claim 7 wherein the ester is a lower alkyl ester of 3,5 - dioxa - 4 - methyl - 1,7 - heptanedioic acid.

References Cited in the file of this patent

UNITED STATES PATENTS

| 2,316,605 | Loder | Apr. 13, 1943 |
| 2,364,455 | Loder | Dec. 5, 1944 |
| 2,387,495 | Coffman | Oct. 23, 1945 |

UNITED STATES PATENT OFFICE

CERTIFICATE OF CORRECTION

Patent No. 2,798,078                                         July 2, 1957

Edward G. Howard, Jr.

It is hereby certified that error appears in the printed specification of the above numbered patent requiring correction and that the said Letters Patent should read as corrected below.

Column 1, line 66, for "butraldehyde" read -- butyraldehyde --; column 2, line 51, for "$C_7H_{10}A_5$" read -- $C_7H_{10}O_5$ --; line 52, for "47.63%" -- 48.63% --.

Signed and sealed this 27th day of August 1957.

(SEAL)
Attest:

KARL H. AXLINE                                              ROBERT C. WATSON
Attesting Officer                                      Commissioner of Patents